Nov. 17, 1970
JAMES E. WEBB
ADMINISTRATOR OF THE NATIONAL AERONAUTICS
AND SPACE ADMINISTRATION
DECODER SYSTEM
3,541,314
Filed Feb. 9, 1968
3 Sheets-Sheet 1
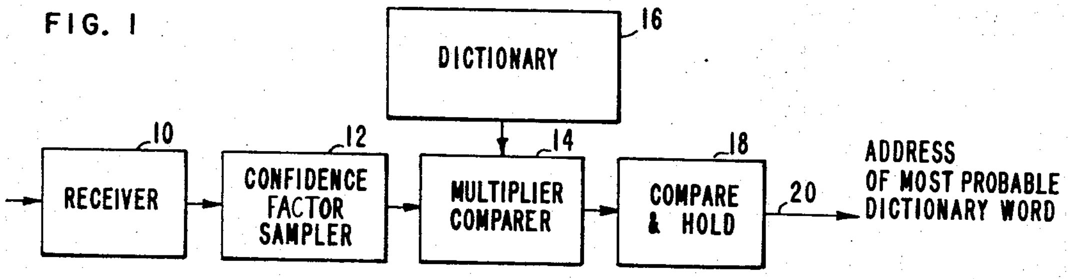
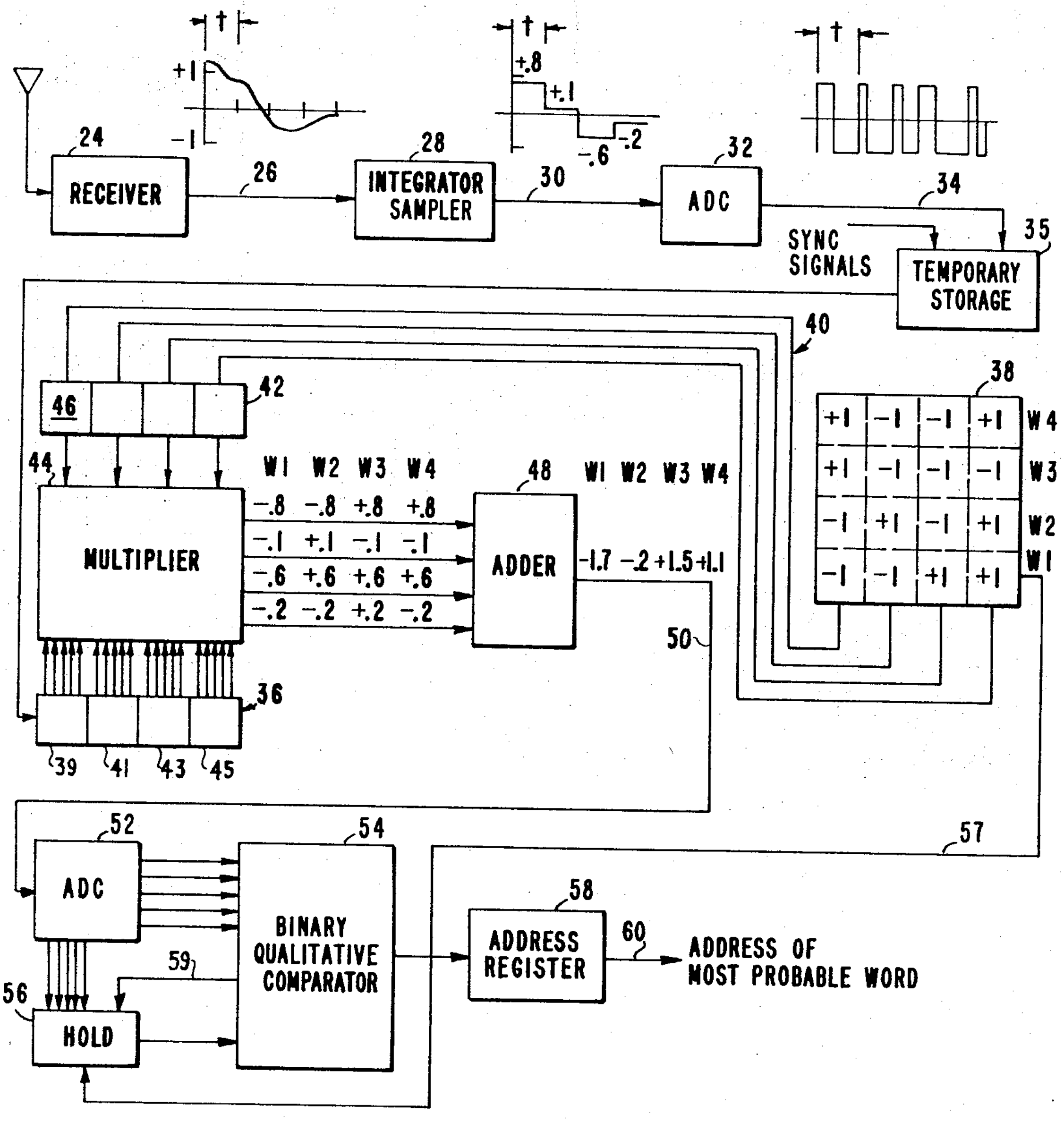
FIG. 2
INVENTOR.
TAGE O. ANDERSON
BY
J. H. Warden
[signature]
ATTORNEYS Nov. 17, 1970 JAMES E. WEBB 3,541,314
ADMINISTRATOR OF THE NATIONAL AERONAUTICS
AND SPACE ADMINISTRATION
DECODER SYSTEM Filed Feb. 9, 1968 3 Sheets-Sheet 2

INVENTOR.
TAGE O. ANDERSON
BY
J. H. Warden
[signature]
ATTORNEYS

INVENTOR.
TAGE O. ANDERSON
BY J. H. Warden
James E. Cox
ATTORNEYS

United States Patent Office 3,541,314
Patented Nov. 17, 1970

3,541,314
DECODER SYSTEM

James E. Webb, Administrator of the National Aeronautics and Space Administration, with respect to an invention of Tage O. Anderson, Arcadia, Calif.

Filed Feb. 9, 1968, Ser. No. 704,465
Int. Cl. G06f 7/02
U.S. Cl. 235—152 5 Claims

ABSTRACT OF THE DISCLOSURE

Binary data decoding apparatus for use at the receiving end of a communication channel on which noise may distort discrete binary signal levels applied to the sending end prior to the signals reaching the receiving end. The apparatus ascribes a "confidence factor" to each received binary symbol indicating the ratio between the received signal level representative of the symbol and the signal level which would be received in the absence of noise. A dictionary is provided defining a plurality of words, each comprised of a plurality of bits. Each received word is compared with all of the dictionary words to determine the correlation value therebetween. A received word is compared with a dictionary word by multiplying the confidence factor of each symbol of the received word with the corresponding bit of the dictionary word. The products so developed are then summed to yield a correlation value. The dictionary word yielding the highest correlation value when compared with the received word identifies the received word.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to data transmission systems.

In many situations, it is necessary to transmit data under conditions which result in the received signals containing large quantities of noise. For example, extraterrestrial space probes transmit data such as television signals to receivers on the earth. Due to the great distances involved, the receivers must determine what the transmitted data was in spite of small signal-to-noise ratios. If the data is represented by a minimum number of binary signals, or bits, the loss of even one bit by noise-masking results in a transmission error. For example, if no redundancies are used, a television picture having areas defined by 64 different levels of brightness could normally be represented by groups of 6 binary symbols each. However, if even one of the 6 symbols were lost in transmission, the indicated brightness level would be erroneous.

A low probability of error can be achieved under noisy communication conditions by encoding the data in a manner which provides many redundancies. Instead of utilizing 6 binary symbols, a coding system can be used which employs 64 binary symbols, so that there are many redundancies. Of the billions of possible combinations of 64 binary symbols, only 64 combinations are utilized to represent the 64 brightness levels.

In many encoding systems which utilize redundancies, a dictionary of meaningful words is maintained at the receiver. Thus, in the above example, a dictionary containing 64 words, each represented by 64 binary symbols, may be used to contain the meaningful words which represent the 64 brightness levels.

Any received group of 64 symbols which does not match one of the dictionary words completely must contain an error. The most probable word which has been received is determined by matching the received group of symbols with each of the dictionary words and choosing the dictionary word having the greatest number of matching symbols as the most probable word.

In order to fully utilize the discriminatory capacity of such redundancy encoding systems, dictionary words are chosen which are very different from each other. As a result, even if a received word contains several errors, it will still be much more similar to one dictionary word than any of the others. Generally, there will be a certain number of symbols by which each dictionary word is different from every other dictionary word, i.e., any pair of dictionary words has the same number of dissimilar symbols. For maximum utilization of the capacity of the coding system, the number of symbols by which any pair of dictionary words is dissimilar is made a maximum.

In communication systems of the type described above, wherein redundancy coding is used, the transmitted signals generally will be received in the presence of noise. The binary level of each symbol is obtained by integrating the received signal over the period of one symbol. The noise which is present results in the integrated value assembling any value between the two binary levels which would be obtained in the absence of noise. Some receiver systems merely assign a binary value to each symbol depending upon which binary level the integrated signal value is closer to. After assigning such binary values, the received word (represented by a group of symbols) is compared with the dictionary words, and every received symbol has the same weight in determining how closely the received and dictionary words match.

Systems which assign a simple binary value to each noisy portion of the received signal representing a binary symbol, waste much of the received information. Not only does each signal portion have an integrated value closer to one binary level than the other, but a determination could be made as to the confidence with which the closest binary level is known. For example, if the binary levels are +1 and −1, an average signal value of +0.5 is not only most probably a +1 but the confidence level with which this determination has been made can be said to be 50%. Greater accuracy in determining the data words represented by received signals could be obtained by assigning a greater weight to those symbols known with a higher confidence than those known with a very low confidence. Such a system would provide a greater probability of error-free data transmission by utilizing all of the available information.

OBJECTS AND SUMMARY OF THE INVENTION

Accordingly, one object of the present invention is to provide a system for communication in the presence of noise, which provides a greater probability of error-free communication than systems available heretofore.

Another object of the invention is to provide a decoding apparatus for use in such a communication system which apparatus is faster than heretofore known decoding devices providing comparable decoding performance.

The present invention provides a system for use at the receiving end of a communication channel which may be subjected to noise. The channel carries data in the form of discrete binary signal levels, which may be distorted prior to reaching the receiver. For example, while an integral of the received signal over the period of one binary symbol may yield values of +1 and −1 in the absence of noise, the integral may be +0.5 due to the presence of noise. The system of the present invention assigns a "confidence factor" to each received signal level. The confidence factor is the ratio between the received signal level and the signal level which would be received in the absence of noise. For example, an integral of +0.5 in a system which yields levels of +1 and −1 in the absence of noise, is represented by a confidence factor indicating the symbol is probably a +1 and the confidence is 50%, i.e., the confidence factor is +0.5. Data is carried over the communication channel by groups of binary symbols, each group representing a code word. In the present invention, confidence factors for the symbols of a code word are derived, and the code word is then represented by a group of confidence factors.

In transmission systems utilizing the receiving methods of the present invention, a large number of symbols may be used to represent each code word so that there is an extremely large number of possible permutations. However, only a limited number of possible permutations of the symbols represent meaningful words. For example, a group of 64 binary symbols representing a word will have $2^{64}$ permutations. However, only 64 of these may in fact represent meaningful words, that is, words which would have been transmitted. A dictionary of these meaningful words is maintained at the receiver. To determine the most probable word which is represented by a group of binary symbols representing a code word, first the confidence factor is derived for each portion of the received signal representing a binary symbol. Each binary symbol may be represented by a confidence factor having any one of a number of values, such as 32 possible values. Then the group of confidence factors is compared with each word in the dictionary to determine their degree of correlations. The dictionary word yielding the highest correlation value is taken to be the word which has been received.

In deriving each correlation value between a received data word and a dictionary word, the circuit of the invention compares each group of confidence factors with the corresponding symbols of the dictionary word whose correlation value is being determined. Each confidence factor and corresponding dictionary symbol which represent the same binary level add to the correlation value by an amount proportional to the confidence factor. For example, a confidence factor of +0.5 and a corresponding dictionary symbol of +1 make a contribution of +0.5 to the correlation value. In this way, the circuit utilizes information about the strength of the received signals giving rise to each confidence factor.

In one embodiment of the invention, it is assumed that synchronizing signals are available to indicate the beginning of each signal portion representing a word. The comparison between the received word and the dictionary word is made by multiplying each binary symbol of a dictionary word with the corresponding confidence factor (which represents a received symbol). These products are added to obtain a sum indicating the degree of correlation between the received word and one dictionary word. The sum obtained in the comparison with each dictionary word is entered into a qualitative comparer. The qualitative comparer compares each sum (representing a degree of correlation) with the sum obtained in the comparison with the previous dictionary word, and retains only the highest sum and the address of the dictionary word giving rise to it. This comparison and hold process continues for the entire dictionary, each comparison resulting in the retention of the higher of two sums. When the comparison has been made for the entire dictionary, the sum, or correlation value, and address left in the comparer are those of the most probable dictionary word. The address of such word is utilized to read out from the dictionary the most probable data word which has been received.

In another embodiment of the invention, the decoding system functions without the necessity of synchronizing signals which indicate the beginning of each data word. This system compares the received symbols (represented by confidence factors) with the dictionary words for all possible phases of the received words. This is accomplished by treating each group of serially-received symbols of the length of one code word as though it represented one code word, even though the group generally represents the last symbols of one code word and the first symbols of the next word. A coding scheme is chosen so that any group of symbols which is not in proper phase, i.e., it contains symbols from two code words, yields a low correlation with every dictionary word.

In one example of a system which does not require synchronizing signals indicating the beginning of code words, a shift register is utilized to hold confidence factors. As each symbol confidence factor is derived, it is serially entered into the first cell of the shift register. During the time required to receive one symbol, the code word in the shift register is compared with all of the words in the dictionary, and the highest correlation value is retained along with the address of the dictionary word yielding that value. When the next confidence factor is received, this is entered into a first cell of the shift register, and all confidence factors therein are shifted by one cell. A comparison of this new word in the shift register is then made with all words in the dictionary, and if such comparison results in a correlation value greater than was derived for the previous comparison, then the new highest correlation value and the corresponding dictionary address are retained. This process continues for a number of symbols equal to the length of one code word, and the address yielding the best correlation is taken as the most probable word. Inasmuch as this embodiment of the invention makes comparisons for a large number of phases, synchronization signals indicating the beginning of each data word can be dispensed with.

A significant feature of the invention is the use of analog and digital circuits to efficiently perform the various operations. Digital circuits are generally used for accurate storing of values, for multiplication operations, and for qualitative comparisons. Analog circuits are used for summing operations. The hybrid circuitry permits rapid and accurate decoding of received code words.

A more complete understanding of the invention may be had by a consideration of the following specification and claims taken in conjunction with the accompanying drawings.

BRIEF DESCRIPTION OF THE DRAWINGS

FIG. 1 is a simplified schematic diagram of a system illustrating the principles of operation of the invention;

FIG. 2 is a schematic diagram of a decoder system constructed in accordance with the invention;

DESCRIPTION OF THE PREFERRED EMBODIMENTS

Figure 3:
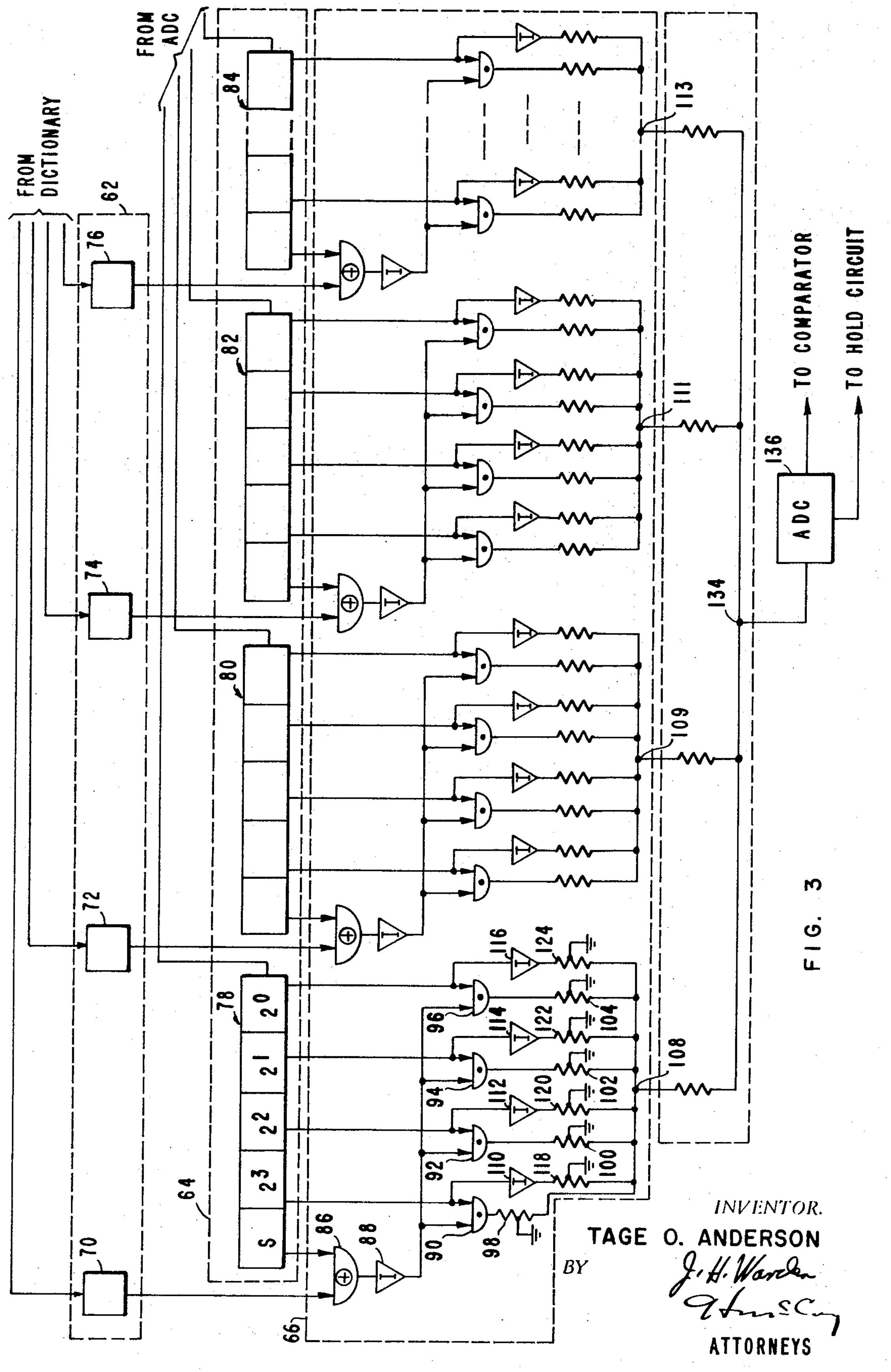
FIG. 3 is a schematic diagram of a multiplier circuit for use in the embodiment of FIG. 2.

FIG. 1 is a simplified schematic diagram of one embodiment of the invention comprising a receiver 10 for receiving signals and delivering those portions representing binary symbols. The receiver may be a circuit for receiving signals from a distant space probe, the signals containing a carrier wave modulated by binary signals and the receiver demodulating the carrier wave and delivering only the binary signal portions.

The output of the receiver 10 is delivered to a confidence factor sampler 12 which samples the received signals, as by taking the integral of the signal over the period of duration of one symbol. The sampler 12 generates a confidence factor output representing a binary level and the confidence with which that binary level is known. For example, if the received signals have binary values of +1 and −1 in the absence of noise, and if the sample is +0.5, then the output of the sampler 12 indicates that the confidence factor is +0.5.

The confidence factors derived by the sampler 12 are serially delivered to a multiplier comparer circuit 14. When the symbols representing an entire code word have been received by the comparer 14, this received code word is compared with each of the words in a dictionary 16 in parallel.

The dictionary 16 contains all of the combinations of symbols which represent meaningful code words. The comparer circuit 14 generates a correlation output for each comparison with a dictionary word to indicate the degree of correlation between the received and dictionary words. The correlation value for each dictionary word and the address of the dictionary word are delivered to a compare and hold circuit 18. The circuit 18 compares the correlation values derived in the comparison of the received code word with each of the dictionary words, and chooses the address of that dictionary word giving the highest correlation value. This address, which is delivered at the output 20 of the compare and hold circuit, indicates the most probable code word which has been received.

The number of symbols constituting a code word and the number of words in a dictionary varies according to the particular application. A typical application of the system is the transmission of code words indicating up to 64 different levels of brightness of a dot of a television raster. The 64 different levels could be represented by six binary digits. However, in order to assure reliable transmission over a noisy channel, each code word may be represented by 64 binary symbols. The code governing the pattern of the 64 binary symbols is generally of a type wherein every symbol has an equal value in contributing to the value of the code word. As a result, a small number of errors cannot grossly affect the value represented by the code word, no matter in which symbol position the errors occur. With 64 binary symbols, there are a possible $2^{64}$ code words, only 64 of which can be correct (i.e., represent a meaningful word). Therefore, a dictionary of 64 code words, each represented by 64 binary symbols, can be used. In this case, each code word in the dictionary has many symbols which are different from those of any other code word in the dictionary.

FIG. 2 is a schematic diagram of one embodiment of a decoder system constructed in accordance with the invention, illustrating the operation of the circuit for a simplified example wherein each code word is represented by only four symbols, and the dictionary contains only four words (out of a possible 64 combinations for 4 binary symbols). In the system of FIG. 2, the received signals which may be received from a distant space probe are delivered to a receiver 24 which provides an output 26 filtered so as to contain only the symbol values plus noise of approximately the same frequency. It is assumed in this example that synchronization has been achieved so that the beginning of each code word is known. Other embodiments, previously mentioned and to be described in detail later, enable detection in cases where synchronization signals are not available.

The output 26 from the receiver 24 is delivered to an integrator sampler circuit 28 which takes samples of the received signals by integrating the signal over the period of a symbol. The output of the sampler 28 is a train of pulses with a duration of each pulse equal to the duration of each symbol, and with a height of each pulse equal to the integral of the received signal over its period. These outputs may be considered to be confidence factors, inasmuch as they indicate the ratio between the noisy signal and the signal in the absence of noise, which indicates the degree of confidence or confidence level with which the received signals are known. For example, a first symbol indicated by the waveform drawn above the output line 30 from the sampler circuit 28 has an integral value of +0.8. This represents a confidence factor of +80%, which indicates that the symbol is a +1 binary digit and the confidence with which that binary level is known is 80%. (Note that a 100% confidence factor does not indicate that a symbol is known with complete certainty, but is a ratio indicating the likelihood is greater than for a lower ratio such as 80%.)

The output 30 of the integrator sampler circuit 28 is delivered to an analog-to-digital converter 32 which converts each confidence factor into a five digit binary number. The first digit indicates the sign of the confidence factor, i.e., the binary value of the symbol, and the other four digits represent the confidence factor ratio for a given symbol. For example, a confidence factor of +0.8 can be represented by the five-digit word 11000, wherein the first 1 represents the positive sign, and the other four digits represent the value 0.8. The purpose of converting the analog output of the sampler circuit 28 to a digital number is to more easily store the output for later comparisons of the received words with the dictionary words. In order to do this, a hybrid circuit of the type illustrated in FIG. 2 is used, employing both analog and digital circuit portions. The converter 32 is utilized in order to facilitate multiplication to be performed by the next circuitry, inasmuch as multiplication is generally easier to accomplish at high speed with digital circuits than with analog circuits.

The output 34 of the converter 32 is delivered to a temporary storing circuit 35 which holds the confidence factors until four have been received, and then, when a synchronization signal is received, delivers the four confidence factors to a register 36. The register 36 has four portions 39, 41, 43, and 45, each of the four portions having five cells for holding each of the five binary digits representing one symbol. As each symbol of a word is delivered to a register 36, the digits thereof are entered into the cells of the register. When all four symbols have been received, so that 20 digits have been entered into the register 36, a comparison of the word represented in the register 36 can be made with all of the words represented in a dictionary 38.

The comparison of the word in the register 36 with all dictionary words is made by multiplying each confidence factor symbol, represented by five digits, by a corresponding binary digit of the dictionary. Inasmuch as each word of the dictionary 38 has four digits, four products are thereby generated. The process entails the delivery of one word at a time from the dictionary 38 to the four output lines 40 of the dictionary circuit. Each row of the dictionary holds four digits representing one dictionary word. The dictionary may comprise a shift register which shifts the four digit values in each row down to the next row at each control pulse input thereto. The digit values in the bottom-most row are delivered over output lines 40 to the register 42.

The four digit values in the register 42 are entered into a multiplier circuit 44, and the twenty digit values from the register 36 are also entered into the multiplier 44. Each confidence factor in the register 36, such as the confidence factor represented in the portion 39 of the register, is multiplied by a corresponding digit value in the dictionary register 42, in this case the value in the cell 46 of the register 42.

The output of the multiplier circuit 44 is a set of four products. These four products are delivered in parallel over four lines to an adder circuit 48. In the example shown in FIG. 2, the dictionary word W1 in the bottom-most row has values of −1, −1, +1, +1. When word W1 is multiplied by the confidence factors +.8, +.1, −.6, −.2, respectively, it yields the four products −.8, −.1, −.6, and −.2. The adder 48 algebraically adds the four products received from the multiplier 44 at each instant, thereby generating a correlation number. For example, the sum of the products −.8, −.1, −.6, and −.2, representing correlation with the word W1, is −1.7. As these sums are generated, by apparatus to be described, they are delivered over the output 50 to the analog-to-digital converter 52.

The converter 52 generates a series of binary digits representing each analog correlation value it receives, such as the value −1.7 in the above example, and delivers the digits in parallel to a binary qualitative comparator circuit 54, and also to a hold circuit 56.

The comparator circuit 54 compares the correlation value from the converter 52 with a correlation value registered in the hold circuit 56 to determine which is larger. If the correlation value received from the converter 52 is larger than the value in the hold circuit 56, then the comparator 54 delivers a pulse on its output 59 to the hold circuit 56 which results in the hold circuit erasing the value which it held and replacing it with the correlation value being received from the converter 52. If the value in the converter 52 is smaller than the value in the hold circuit 56, the value in the hold circuit is not changed. Along with the correlation value, the hold circuit 56 also stores the address in the dictionary 38 from which the dictionary word was obtained, which resulted in the stored correlation value. An additional set of digits (not shown) is included with each row of the dictionary to indicate the address of the row at every instant, and these address-indicating digits are delivered over line 57 to the hold circuit 56.

Thus, after each code word is entered in the register 36, the comparator 54 receives the correlation values resulting from a comparison of the received code word with the words in the dictionary. The comparator compares each correlation value in the hold circuit 56 with the next correlation value to be received and causes the hold circuit 56 to register the higher of the two. After all words in the dictionary have been compared with the received word, the address of the dictionary word yielding the highest correlation value is delivered by the hold circuit 56 through the comparator 54 to an address register 58. The address register 58 delivers on its output 60 the address of the word most closely corresponding to the received word, and the circuit indicates that this dictionary word should be assumed to be the received word. Thus, the address register serves as an indicating means for indicating which dictionary word has the greatest degree of correlation with the group of received input symbols.

The circuit of FIG. 2 is designed to attain high speed and circuit simplification, by using both analog and digital circuit portions. The analog-to-digital converter 32 is utilized to carry out the multiplication by first converting the confidence factors obtained from the sampler 28, to the digital domain. An adder circuit 48, to be described in detail, performs summations in the analog domain, using the digital outputs of the multiplier 44. Analog addition can be done rapidly with considerably simpler circuits than addition in the digital domain. The converter 52 is utilized because it is generally easier to accurately retain digital values than analog values. It should be noted that the hold circuit 56 must retain a correlation value, delivering samples of it to the comparator 54. In a typical system which may utilize a dictionary of 64 words or more, the hold circuit 56 would have to retain the correlation value for the period of 64 comparisons and deliver this value for up to 63 times to the comparator circuit 54. This generally can be done most easily by registering the correlation values in the digital domain. It may be noted that the comparator circuit 54 need only determine which is the greater of two inputs and does not have to determine how much one is greater than the other.

FIG. 3 is a schematic diagram of circuitry corresponding to the multiplier 44 and adder 48 of FIG. 2, for multiplying the confidence factors of received signals by dictionary words and for adding the products to obtain correlation values. The circuit includes a register 62 for holding words from the dictionary and a register 64 for holding confidence factors derived from the received signals, corresponding to the circuits 42 and 36 of FIG. 2. The circuit also includes a multiplier circuit 66 and an adder circuit 68, corresponding to the circuits 44 and 48 in FIG. 2. A four digit word from the dictionary is entered into the four cells 70, 72, 74, and 76 of the register 62, one digit of the dictionary word entering each cell. Each of the four confidence factors representing one code word is entered into one of the four register portions 78, 80, 82, and 84 of the register 64. Each of the portions, such as 78, includes five register cells, a first labeled *s* holding a digit for indicating the sign of the confidence factor, and the four other cells labeled "$2^3$, $2^2$, $2^1$, and $2^0$" holding digits for indicating up to sixteen different confidence factors.

The correlation of the four-digit dictionary word with the received word represented by four confidence factors, is accomplished by multiplying corresponding digits in the multiplier 66 and adding the products in the adder 68. Inasmuch as each dictionary digit has a level of only +1 or −1, its multiplication by the confidence factor is accomplished by first multiplying it by the sign of the confidence factor, which is accomplished with the exclusive OR gate 86. If the dictionary digit and the confidence factor sign are equal, that is, either both are +1 or both are −1, then the output of gate 86 is 1, and if they are different, the output is −1. The output of the gate 86 is passed through INVERTER gate 88 so that if the signs of the dictionary digit and confidence level are the same, the output is one, and if they are different, the output is 0. The output of the INVERTER gate 88 is delivered to four AND gates 90, 92, 94 and 96. Also entering the AND gates is the output from the four other confidence factor register cells. For each confidence factor digit which is +1, a 1 will be delivered to the corresponding AND gate to pass any output from the INVERTER 88. The output for each AND gate passes through a resistor 98, 100, 102 and 104, to a summing junction 108. The output of each of the four cells of a portion 78 of the entire register 64 also pass through INVERTER gates 110, 112, 114 and 116 and through resistors 118, 120, 122, and 124.

The resistors between each AND gate such as 90 and the junction 108 are chosen to pass currents proportional to the digit value of the cell connected to the AND gate. The resistors connected between the INVERTERS, such as 110, and the summing junction 108 are chosen to pass currents representing a reference level that represents zero.

An example of an addition by the circuit of FIG. 3 will aid in its understanding. It may be assumed that a reference level at junction 134 is defined as 6 volts, so that 12 volts at junction 134 indicates perfect correlation, while zero volts indicates complete lack of correlation. At each of the four summing junctions 108, 109, 111, and 113, the reference level is 1.5 volts so that 3.0 volts indicates perfect correlation. An example for only the portion 78 of the register 64 will be given.

For ease in understanding, the binary levels are designated by 0 and 1, and the output of cell 70 is zero volts when it contains a binary level 0 and is one volt when it contains a binary 1. Also, the binary levels 0 and 1 of the cells labeled S, $2^3$, $2^2$, $2^1$ and $2^0$ of portion 78 are indicated by outputs of zero volts and one volt, respectively.

It may also be assumed that the digit in cell 70 is 1 while the digits in the portion 78 are 11000, representing a confidence factor of +0.8.

Continuing with the above example, the output from the cell 70 and the S cell enter the exclusive OR gate 86, and the 0 output therefrom results in the inverter 88 delivering a 1 output. The 1 output from inverter 88 enters the AND cells 90, 92, 94, and 96. The 1 output from the $2^3$ cell of portion 78 passes through AND gate 90, which is constructed to deliver a current output of two (e.g., two milliamperes) to the resistor 98, which reduces this current to a current level of 1.6 at the summing junction 108 (the rest of the current flows to ground). The inverter 110 delivers no current through resistor 118 to the summing junction 108. The confidence factor cell $2^2$ of the portion 78 delivers 0 to the AND gate 92 which therefore delivers nothing to resistor 100. However, the inverter 122 delivers a current of 1 to resistor 120, which reduces this current so that a current of 0.4 is added to summing junction 108. The same occurs for the outputs from the cells $2^1$ and $2^0$, which contribute current values of 0.2 and 0.1, respectively, to the summing junction 108. Accordingly, the total current entering summing junction 108 is 2.3. Inasmuch as a current value of 1.5 is taken as a reference level, the result of the multiplication of the digit in cell 70 and the confidence factor in portion 78 is 0.8 above the reference level. This indicates a product of 0.8 to be added to the correlation sum.

If the dictionary digit in cell 70 were 0, while the confidence factor was the same as in the previous example, the output of exclusive OR gate 86 would be 1, the output of the INVERTER 88 would be 0, and no current would flow through any of the AND gates 90 through 96. Then the only output would be from the resistors connected to the inverter gates 110, 112, 114 and 116. Zero current would flow through resistor 118, a current of 0.4 would flow through resistor 120, a current of 0.2 through resistor 122 and 0.1 through resistor 124. The total current entering summing junction 108 would, therefore, be 0.7, which is 0.8 below the reference level of 1.5. This indicates a product of −0.8 to be added to the correlation sum.

The currents through the summing junction 108 are added to the currents from the summing junctions 109, 111, and 113. The total is delivered to the adder 68 and flows into the junction 134 of the adder. The sum of the currents flowing to the summing junction 134 is delivered to the ADC 136, corresponding to the ADC 52 of FIG. 2. This sum represents the correlation value obtained by comparing the received code word with one dictionary word.

Figure 4:
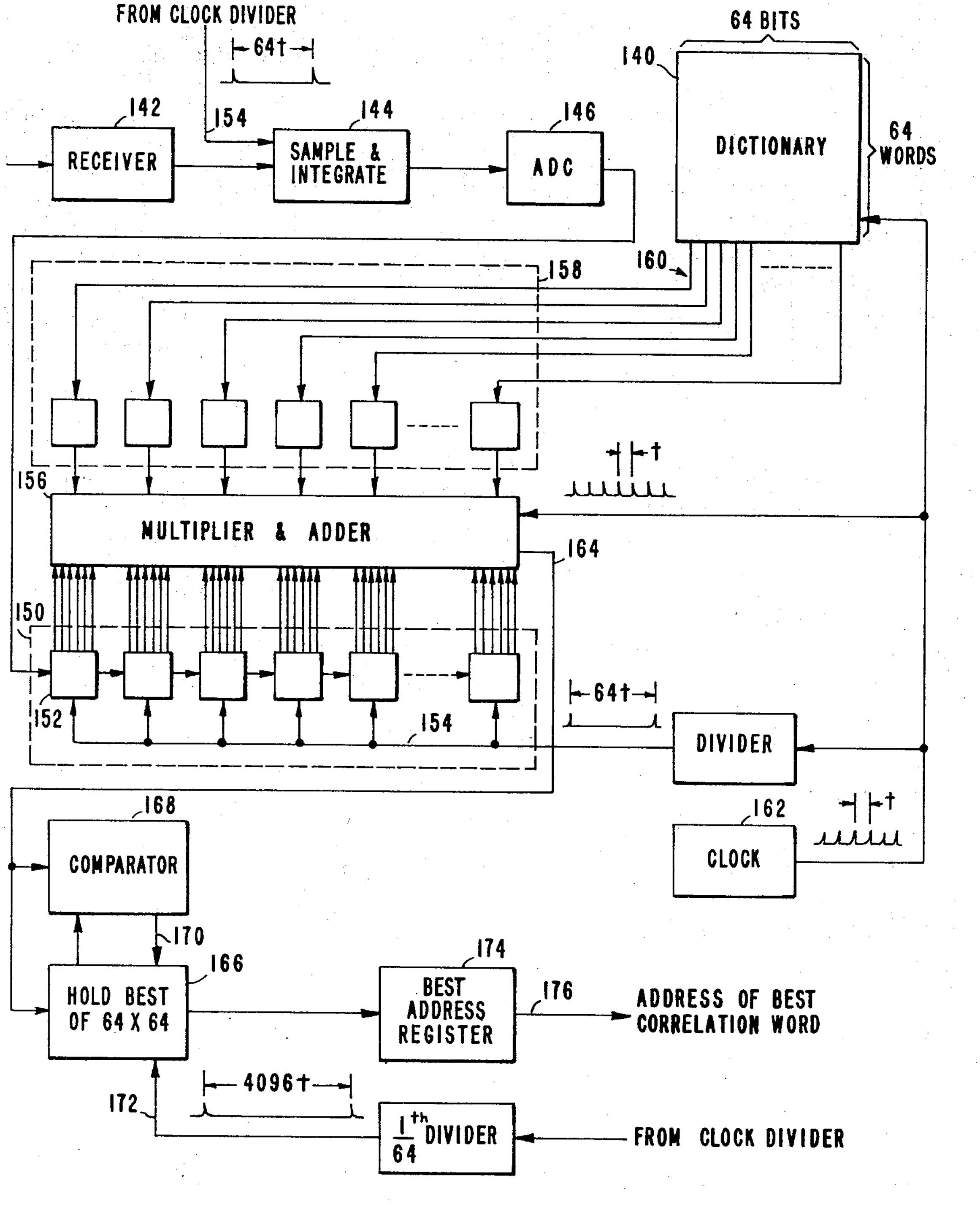
FIG. 4 is a schematic diagram of a second embodiment of the invention.

FIG. 4 illustrates another embodiment of the invention which is useful for decoding where no reliable synchronizing signals are available to indicate the beginning of each code word. This circuit treats each group of symbols of the length of one code word as though it constituted a code word. Of course, in most cases, the group of symbols would contain the last symbols of one cord word and the first symbols of the next code word to be transmitted. By comparing each of these groups of symbols with all of the words in a dictionary, a multitude of correlation values is obtained. The highest correlation value will be obtained for the case where all symbols in a group are actually from a single code word. This embodiment of the invention requires the use of comma-free codes, wherein no dictionary word is closely similar to a group of symbols representing the last digits of one dictionary word and the first digits of another dictionary word. A more complete description of comma-free codes will be given later.

The circuit of FIG. 4 may be used for decoding signals representing 64 different values, such as 64 different brightnesses of a dot of a television picture raster. The 64 levels are represented by sixty-four binary symbols. Of the $2^{64}$ possible combinations of sixty-four binary symbols, only 64 combinations have meaning. Each of these 64 meaningful words, representing brightness values, is entered into the dictionary 140.

The incoming signals received by a receiver 142 are demodulated and filtered to obtain signals representing symbols. Each symbol has a duration of $64t$, where $t$ represents a given time period, and groups of symbols represent code words. Each signal portion of a duration $64t$ is of one binary level, but includes noise which may mask the binary level. The signals from the receiver 142 are entered into a sample and integrate circuit 144. The sample and integrate circuit 144 integrates the signal received from the receiver for a time period of $64t$ equal to the duration of one symbol and delivers a voltage of a level equal to this integral to the analog-to-digital converter 146.

At the end of each time period $64t$, a clock delivers a pulse over clock line 154 to the circuit 144. The clock pulse begins a new integrating period, and causes circuit 144 to deliver its output obtained over the preceding integrating period $64t$.

The output of the converter 146 is delivered to a shift register 150 having 64 cell groups, each cell group having five cells. A group of five digits representing one confidence factor is delivered in parallel to the first five-cell group 152 of the shift register. Also delivered to each cell group of the shift register 150 is the clock input 154 with pulses spaced a time $64t$ apart. At every pulse delivered over line 154, all of the five-cell groups of the shift register 150 shift their contents to the next succeeding cell group. The output from each cell group is delivered to a multiplier and adder circuit 156. Also delivered to the multiplier and adder circuit 156 is the output from a dictionary register 158.

The dictionary register 158 has 64 cells, each receiving a binary bit from one line of a group of lines 160 connected to the dictionary 140. The dictionary 140 receives pulses spaced a distance $t$ apart, from the clock 162. Each pulse causes the dictionary to downshift each word by one row and enter the digits of the last row into the cells of the dictionary register 158. The pulses spaced a time $t$ apart also enter the multiplier and adder circuit 156, commanding it to multiply the confidence levels in the 64 cell groups of the shift register 150 by the corresponding 64 digits entered into dictionary register 158. The 64 products are added by the multiplier and adder circuit 156 and delivered over output line 164 thereof.

Thus, each time a new symbol is entered into the cell group 152, a shift of all confidence factors in the shift register occurs. After the shift, the register contains a new word. A comparison of each such new word is made with all 64 words in the dictionary 140, to generate 64 correlation values. This requires a time of $64t$. It requires a time of 64×64 or 4096 periods of the interval $t$ to receive the 64 symbols representing an entire data word, and during this period, 4096 correlation values are produced and delivered over the output line 164. The best, or highest correlation value, is retained in the hold circuit 166.

The correlation values delivered over output line 164 are received by both a comparator circuit 168 and the hold circuit 166. The hold circuit 166 holds a correlation value and constantly delivers it to the comparator 168. The comparator compares the correlation value in the hold circuit 166 with the new correlation level received over the output line 164 of the multiplier and adder circuit. If the correlation level input over line 164 is greater than the correlation level held in the hold circuit 166, then the comparator delivers a signal over output 170 to the hold circuit 166. Such a signal at 170 commands the hold circuit to substitute the new correlation level (and dictionary address corresponding thereto received from the dictionary over a line, not shown) in the hold circuit in place of the previously held correlation level therein. This process continues for a period of $4096t$.

At the end of the 4096$t$ period, a pulse is delivered to hold circuit 166 over line 172. This pulse commands the hold circuit to expel the correlation level therein and substitute a zero correlation level therefor. At the same time, the hold circuit delivers the dictionary address corresponding to the correlation level held therein, to the best address register 174. The output of the best address register 174 changes at intervals of 4096$t$. During each such interval, an output 176 of the best address register is delivered which represents the address of the most probable word which has been received during a preceding 4096$t$ interval.

The circuit of FIG. 4 is useful only for comma-free codes. Such codes have the characteristic that no two adjacent portions of different dictionary words are identical to a dictionary word (and preferably not even closely identical). For example, in a comma-free code, the last ten digits of one word and the first fifty-four digits of another word will not constitute a pattern closely identical to any of the sixty-four words in the dictionary. The use of a comma-free code prevents the obtaining of a high correlation between a group of received symbols and the symbols representing a dictionary word, unless all of the received symbols actually represent a single dictionary word.

While a particular embodiment of the invention has been illustrated and described, it should be understood that many modifications and variations may be resorted to by those skilled in the art, and the scope of the invention is limited only by a just interpretation of the following claims.

What is claimed is:

1. A decoder system for determining the most probable data word represented by binary symbol values available in the form of noisy signals comprising:

analog-to-digital converter means responsive to said noisy signals for generating a set of binary signals representing the analog value of a portion of said noisy signals which represents a binary symbol value;

register means coupled to said analog-to-digital converter means for holding a plurality of sets of binary signals which may represent a data word;

dictionary means for holding a plurality of binaiy digits representing data words;

matching means coupled to said register means and said dictionary means for multiplying each set of binary signals in said register means by a corresponding binary digit from said dictionary means to derive products;

adding means coupled to said matching means for selectively adding the products derived by multiplying all of the sets of binary signals in said register means by corresponding binary digits representing one dictionary word to derive a correlation value; and comparator means responsive to said adding means for indicating the dictionary word having the highest correlation with a plurality of sets of binary digits which may represent a data word.

2. The decoder system described in claim 1 wherein:

said adder means comprises means for adding currents; and including second analog-to-digital converter means coupled to said adder means for generating digital signals representing the level of current generated by said adder means; and wherein said comparator means comprises a digital register coupled to said second analog-to-digital converter means for holding said digital signals.

3. A decoder system for determining the most probable data word represented by a plurality of binary symbol values available in the form of noisy signals comprising:

means coupled to said noisy signals for taking their values at intervals approximately equal to the intervals at which signals representing new binary values have been transmitted, to derive confidence signals;

shift register means coupled to said confidence signals for registering a plurality of said confidence signals equal to the length of a data word, said register means constructed to shift the position of each confidence signal by one position as each new confidence signal is received by it;

dictionary means for holding a plurality of binary digits representing data words;

matching means coupled to said shift register means and said dictionary means for generating correlation values indicating the algebraic sum of the products of dictionary digits with corresponding confidence signals after each new confidence signal is entered into said shift register means; and comparator means coupled to said matching means for indicating the highest correlation value derived by said matching means at intervals equal to the period between the receipt of a confidence signal into a first cell of said shift register means and the shifting of the same confidence signal out of the last cell of said register means.

4. A decoder system for determining the most probable word represented by noisy signals comprising:

sampler means coupled to said noisy signals for generating confidence signals indicating binary values of inputs thereto and the confidence level to which said binary values are known;

dictionary means for holding a plurality of binary digits representing data words;

matching means coupled to said sampler means and said dictionary means for generating a correlation value indicating the algebraic sum of the products of each dictionary digit with each corresponding confidence signal, each of said products having a magnitude related to the confidence level of a confidence signal and having a sign determined by the correlation between the binary value indication of a confidence signal and a corresponding dictionary digit; and comparator means coupled to said matching means for indicating the dictionary word having the highest correlation with a group of said confidence signals, said comparator means including register means for registering correlation values, qualitative comparing means coupled to a correlation value in said register means and the output of said matching means for indicating the greater of the two correlation values from them, and means coupled to said qualitative comparing means for entering the correlation value from said matching means into said register means when the correlation value from said matching means is greater than the correlation value stored in said register means.

5. A decoder system comprising:

receiver means for delivering binary signals received in a noisy background;

sampler means coupled to said receiver means for generating symbol confidence factors indicating the binary values of signals from said receiver means and the strengths of the signals which indicated the binary values;

register means coupled to said sampler means for registering a plurality of said symbol confidence factors;

dictionary means for holding a plurality of dictionary words represented by digits;

dictionary readout means coupled to said dictionary means for reading out words in said dictionary means;

multiplier means coupled to said register means and coupled to said dictionary readout means for generating product representations of magnitudes dependent upon the magnitudes of said symbol confidence factors and with sign representations dependent upon the correlation between the binary value of each symbol confidence factor and the digit value of a corresponding dictionary digit;

adder means coupled to said multiplier means for generating a signal indicating the algebraic sum of said product representations from said multiplier means; and qualitative comparator means coupled to said adder means for indicating which algebraic sum is the greatest, said comparator means including register means for holding a first of said algebraic sums, qualitative comparing means for comparing said first sum held in said register means and a second sum generated by said adder means at a time after it generated said first sum, and means for retaining the first sum in said register means when it is greater than the second sum and for replacing the first sum held in said register means with the second sum last received from said adder means when the second sum is greater than the first sum.

References Cited

UNITED STATES PATENTS

| | | | |
|---|---|---|---|
| Re. 26,104 | 11/1966 | Glauberman et al. | 340—146.2 |
| 3,022,005 | 2/1962 | Dickinson | 235—152 |
| 3,114,132 | 12/1963 | Trimble et al. | 340—146.2 |
| 3,237,160 | 2/1966 | Mitchell | 340—146.1 |
| 3,346,844 | 10/1967 | Scott et al. | 340—146.2 |

MALCOLM A. MORRISON, Primary Examiner

J. F. GOTTMAN, Assistant Examiner

U.S. Cl. X.R.

340—146.2; 235—181